United States Patent
Bryan et al.

(10) Patent No.: US 12,406,456 B2
(45) Date of Patent: Sep. 2, 2025

(54) STATISTICAL SHAPE AND APPEARANCE MODELING FOR VOLUMETRIC GEOMETRY AND INTENSITY DATA

(71) Applicant: Synopsys, Inc., Sunnyvale, CA (US)

(72) Inventors: Rebecca Louise Bryan, Bishopsteignton (GB); David Richard Raymont, Devon (GB); Furqanullah Furqanullah, Exeter (GB); Christopher John Louis Goddard, Exeter (GB); Mark Taylor, Adelaide (AU)

(73) Assignee: Synopsys, Inc., Sunnyvale, CA (US)

( * ) Notice: Subject to any disclaimer, the term of this patent is extended or adjusted under 35 U.S.C. 154(b) by 221 days.

(21) Appl. No.: 18/138,672

(22) Filed: Apr. 24, 2023

(65) Prior Publication Data
US 2024/0355078 A1    Oct. 24, 2024

(51) Int. Cl.
*G06T 19/20*    (2011.01)
*G06T 7/50*    (2017.01)
*G06V 10/74*    (2022.01)

(52) U.S. Cl.
CPC .......... *G06T 19/20* (2013.01); *G06T 7/50* (2017.01); *G06V 10/761* (2022.01); *G06T 2219/2004* (2013.01)

(58) Field of Classification Search
CPC ... G06T 19/20; G06T 7/50; G06T 2219/2004; G06V 10/761
See application file for complete search history.

(56) References Cited

U.S. PATENT DOCUMENTS 6,858,003 B2 *   2/2005   Evans ............... A61B 34/71
                                                    606/1
9,019,237 B2 *   4/2015   Ludwig ............ G06F 3/04883
                                                    345/158

(Continued)

OTHER PUBLICATIONS

Agudo et al—Combining Local-Physical and Global-Statistical Models for Sequential Deformable Shape from Motion -201611—Sprin (Year: 2016).*

(Continued)

*Primary Examiner* — Yujang Tswei
(74) *Attorney, Agent, or Firm* — Patterson + Sheridan, LLP

(57) ABSTRACT

An image-based approach for statistical shape and appearance modeling includes re-orienting (rotating/translating) training masks to align the training masks with a reference mask to provide corresponding re-orientation parameters, where the training masks represent 3-dimensional shapes of a population of objects and the reference mask represents a 3-dimensional shape of a reference object, deforming the re-oriented training masks based on the reference mask to provide displacement fields indicative of differences between a 3-dimensional shape of the reference mask and 3-dimensional shapes of the re-oriented training masks, re-orienting training backgrounds based on the re-orientation parameters, where the training backgrounds represent volumetric intensity data of the 3-dimensional images of the objects, deforming the re-oriented training backgrounds based on the displacement fields, combining the deformed training backgrounds and the displacement fields, and reducing a dimensionality of the combined deformed training backgrounds and displacement fields to provide a statistical shape and appearance model.

19 Claims, 6 Drawing Sheets

(56) References Cited

U.S. PATENT DOCUMENTS

| | | | | |
|---|---|---|---|---|
| 11,348,257 | B2* | 5/2022 | Lang | A61B 90/92 |
| 12,211,151 | B1* | 1/2025 | Chiou | G06T 19/003 |
| 2009/0297012 | A1* | 12/2009 | Brett | G06V 10/755 |
| | | | | 382/128 |
| 2014/0323845 | A1* | 10/2014 | Forsberg | G06T 7/60 |
| | | | | 600/407 |
| 2016/0239966 | A1* | 8/2016 | Parsey | A61B 6/037 |
| 2017/0354385 | A1* | 12/2017 | Lerch | A61B 6/4435 |
| 2018/0031719 | A1* | 2/2018 | Huang | G06T 17/20 |
| 2020/0284883 | A1* | 9/2020 | Ferreira | G01S 7/4815 |
| 2021/0134467 | A1* | 5/2021 | Poltaretskyi | A61B 5/1127 |
| 2022/0160430 | A1* | 5/2022 | Landon | A61B 90/36 |
| 2023/0237661 | A1* | 7/2023 | Hsiao | G06N 3/08 |
| | | | | 382/128 |

OTHER PUBLICATIONS

Krebs—Robust medical image registration and motion modeling based on machine learning—2020—HAL open science (Year: 2020).*

Li et al—A diffeomorphic demons approach to statistical shape modeling—201801—ResearchGate (Year: 2018).*

Zikic Contributions to Medical Image Registration—2011—Technische Universitä" At Mä" UNCHEN (Year: 2011).*

Vercauteren, et al., "Non-parametric Diffeomorphic Image Registration with the Demons Algorithm", Non-parametric Diffeomorphic Image Registration with the Demons Algorithm. Medical Image Computing and Computer Assisted Intervention (MICCAI€™07), Oct. 2007, Brisbane, Australia. pp. 319-326, T ¿¿ 10.1007/978-3-540-75759-7_39 .inria-00166123.

Heimann, et al., "Statistical shape models for 3D medical image segmentation: A review", Medical Image Analysis 13 (2009) 543-563.

Day et al., "Using Statistical Shaper and Appearance Modelling to Characterise the 3D Shape and Material Properities of Human Lumbar Vertebrae: A Proof of Concept Study" Journal of teh Mechanical Behavior of Biomedical Materials 126 (2022).

Zitpva et al., "Image Registration Methods: A Survey" Department of Image Processing, Institute of Information Theory and Automation, Academy of Sciences of the Czech Republic Pod 4, 182 08 Prague 8, Czech Republic Received Nov. 9, 2001; received in revised form Jun. 20, 2003; accepted Jun. 26, 2003.

Erdt, et al., "Smart Manual Lnadmarking of Organs" Article in Proceedings of SPIE Mar. 2010.

Grassi, et al., "Statistical Shape and Appearance Models: Development Towards Improved Osteoporosis Care" Current Osteoporosis Reports (2021) 19:676-687.

* cited by examiner

STATISTICAL SHAPE AND APPEARANCE MODELING FOR VOLUMETRIC GEOMETRY AND INTENSITY DATA

TECHNICAL FIELD

The present disclosure generally relates to a three-dimensional (3D) image segmentation and model generation system. In particular, the present disclosure relates to statistical shape and appearance modeling for volumetric geometry and intensity data.

BACKGROUND

In-silico trials are becoming of increasing interest for use in medical device research and development, and for generation of evidence of safety and efficacy for regulatory submission of a new design, design modification, or treatment. Regulatory bodies, such as the U.S. Food and Drug Administration (USFDA), encourage adoption of computational modelling and simulation (CM&S). CM&S provide a number of advantages over conventional in-vivo (animal/human) testing and in-vitro (i.e., bench) testing, such as reduced costs, reduced time-to-market, acceleration of development cycles, and reduced risks and suffering associated with in-vivo testing.

A significant barrier to wider adoption of in-silico trials is a need for large numbers of patients to construct computational models on which to perform simulation or analysis. Traditionally this would require access to large numbers of clinical imaging data sets, such as from computed tomography (CT) scans or magnetic resonance imaging (MRI) scans, which is often infeasible due to cost, acquisition time, and data privacy restrictions.

A statistical shape model (SSM) is a geometric model that describes a collection of semantically similar objects. A SSM represents an average shape, or mean, of an object (e.g., pelvises) within a population, and variations in the shapes within the population. A statistical shape and appearance model (SSAM) incorporates appearance data (e.g., color or texture represented by voxel intensity) extracted from images of the objects.

SUMMARY

Techniques for statistical shape and appearance modeling for volumetric geometry and intensity data are described.

One example is a machine-implemented method that includes re-orienting training masks to align the training masks with a reference mask to provide corresponding re-orientation parameters (where the training masks represent 3-dimensional shapes of a population of objects and the reference mask represents a 3-dimensional shape of a reference object), deforming the re-oriented training masks based on the reference mask to provide displacement fields indicative of differences between a 3-dimensional shape of the reference mask and 3-dimensional shapes of the re-oriented training masks, re-orienting training backgrounds based on the re-orientation parameters to provide re-oriented training backgrounds (where the training backgrounds represent volumetric intensity data of the 3-dimensional images of the objects), deforming the re-oriented training backgrounds based on the displacement fields of the respective training masks to provide deformed training backgrounds, combining the deformed training backgrounds and the displacement fields, and reducing a dimensionality of the combined deformed training backgrounds and displacement fields to provide a statistical shape and appearance model.

Re-orienting training masks may include converting the training masks and the reference mask to triangulated meshes, and re-orienting the triangulated meshes of the training masks to the triangulated meshes of the reference mask based on an iterative closest point method to provide the re-orientation parameters to include iterative closest point transformation matrices.

Deforming the re-oriented training masks may include computing signed distance maps of the re-oriented training masks and the reference mask, and computing the displacement fields based on the signed distance maps. The displacement fields may be computed with a diffeomorphic demons deformable method. Deforming the re-oriented training masks may include representing the displacement fields as images having vector-type pixels with N elements, where N is a dimensionality of the reference mask.

Combining may include combining the deformed training backgrounds and the displacement fields in a matrix. The matrix may be scaled, such as by computing means of rows of the matrix and dividing the rows of the matrix by the means of the respective rows. The dimensionality of the matrix may be reduced based on principal component analysis to provide the statistical shape and appearance model to include a mean dataset, modes of variation, and weighting, wherein the modes of variation and the weighting reflect variations in the objects relative to a mean of the objects.

The statistical shape and appearance model may be used to generate virtual objects based on variations amongst the training masks and the training backgrounds, analyze variability in shape and material properties of the population of objects based on variations amongst the training masks and the training backgrounds, and/or predict missing information from a partial dataset of masks and backgrounds extracted from 3-dimensional images of other objects.

Another example is a non-transitory computer readable medium encoded with a computer program that includes instructions to cause a processor to compute signed distance maps of training masks and of a reference mask (where the training masks represent 3-dimensional shapes of a population of objects extracted from 3-dimensional images of the objects and the reference mask represents a 3-dimensional shape of a reference object), compute displacement fields indicative of geometric differences between the reference mask and the training masks based on the respective signed distance maps, deform training backgrounds based on the displacement fields to provide deformed training backgrounds (where the training backgrounds comprise volumetric intensity data extracted from the 3-dimensional images of the training objects), combine the deformed training backgrounds and the displacement fields, and reduce a dimensionality of the combined deformed training backgrounds and displacement fields to provide a statistical shape and appearance model.

The instructions may include instructions to compute the displacement fields with a diffeomorphic demons deformable method.

The instructions may include instructions to represent the displacement fields as images having vector-type pixels with N elements, where N is a dimensionality of the reference mask.

The instructions may include instructions to combine the deformed training backgrounds and the displacement fields in a matrix. The instructions may further include instructions to scale the matrix, such as by computing means of rows of the matrix and dividing the rows of the matrix by the means of the respective rows. The instructions may include instructions to reduce a dimensionality of the matrix based on principal component analysis to provide the statistical shape and appearance model to include a mean dataset, modes of variation, and weighting, wherein the modes of variation and the weighting reflect variations in the objects relative to a mean of the objects.

The instructions may include instructions to use the statistical shape and appearance model to generate virtual objects based on variations amongst the training masks and the training backgrounds, analyze variability in shape and material properties of the population of objects based on variations amongst the training masks and the training backgrounds, and/or predict missing information from a partial dataset of masks and backgrounds extracted from 3-dimensional images of other objects.

Another example is an integrated circuit (IC) device that includes re-orientation circuitry that aligns training masks with a reference mask to provide corresponding re-orientation parameters and re-orients training backgrounds based on the re-orientation parameters to provide re-oriented training backgrounds, and deformation circuitry that deforms the re-oriented training masks based on the reference mask to provide displacement fields indicative of differences between a 3-dimensional shape of the reference mask and 3-dimensional shapes of the re-oriented training masks and deforms the re-oriented training backgrounds based on the displacement fields of the respective training masks to provide deformed training backgrounds.

The deformation circuitry may deform the re-oriented training masks and the re-oriented training backgrounds by deformably registering signed distance maps of the re-oriented training masks to provide an initial set of displacement fields, deformably registering background intensity values of the re-oriented training backgrounds based on the initial set of displacement fields to provide an initial set of deformed training backgrounds, deformably registering the initial set of displacement fields to provide a refined set of displacement fields, and refining the initial set of deformed training backgrounds based on the refined set of displacement fields to provide a refined set of deformed training backgrounds.

The IC device may further include combining circuitry that combines the deformed training backgrounds and the displacement fields, and dimensionality reduction circuitry that reduces a dimensionality of the combined deformed training backgrounds and displacement fields to provide a statistical shape and appearance model (SSAM).

The IC device may further include SSAM application that generates virtual objects based on variations amongst the training masks and the training backgrounds, analyzes variability in shape and material properties of the population of objects based on variations amongst the training masks and the training backgrounds, and/or predicts missing information from a partial dataset of masks and backgrounds extracted from 3-dimensional images of other objects.

BRIEF DESCRIPTION OF DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
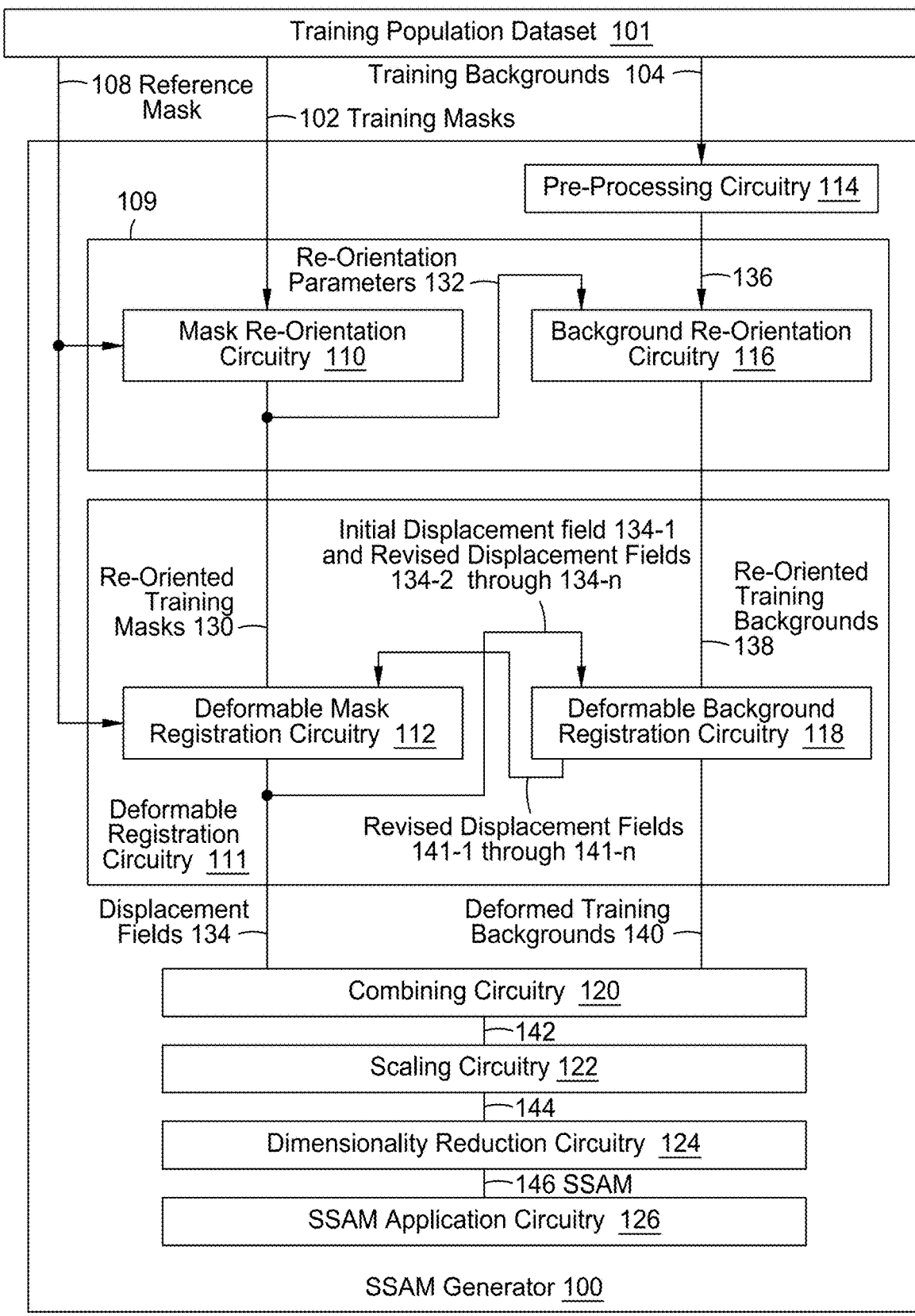
FIG. 1 is a block diagram of a statistical shape and appearance model (SSAM) generator that generates a statistical shape and appearance model based on training data extracted from images of objects, according to an embodiment.

Aspects of the present disclosure relate to statistical shape and appearance modeling for volumetric (i.e., 3-dimensional) geometry and intensity data. Volumetric geometry and intensity data may be obtained from 3-dimensional images of the objects. The intensity data may correspond to material properties of the respective objects (e.g., bone mineral density). The 3-dimensional images may include, without limitation, medical images such as computed tomography (CT) scans, micro CT scans, and/or magnetic resonance imaging (MRI) scans. A SSAM essentially describes geometric variations amongst the objects and variations in the scalar or vector values of the objects.

A challenge in generating a statistical shape and appearance model (SSAM) is that 3-dimensional medical images contain significant amounts of data. As a result, capturing shape and intensity variations amongst the objects is computationally intensive.

Another challenge in generating a SSAM is that 3-dimensional images of objects may be taken from different reference points and/or distances, which make it difficult to correctly identify differences in shapes and intensities amongst the images.

Another challenge in generating a SSAM is combining the shape and intensity variations into a model.

Another challenge in generating a SSAM is reducing the complexity or dimensionality of the combined shape and intensity variations.

Embodiments herein describe techniques to overcome/accommodate the aforementioned challenges, and other challenges.

Embodiments herein describe an image-based approach in which 3-dimensional shape information, referred to herein as training masks, and 3-dimensional appearance information (i.e., intensity or greyscale volumetric data), referred to herein as training backgrounds, are extracted from training images of a population of objects. In an embodiment, the training masks are re-oriented (i.e., translated, rotated, and/or re-sized) to match an orientation of a reference mask, and the training backgrounds are re-oriented based on the reorientations of the respective training masks.

Geometric differences between the reference mask and the re-oriented training masks are computed as displacement fields (e.g., N dimensional vector fields), and the displacement fields are applied to the re-oriented training backgrounds. Resultant deformed training backgrounds are combined with the displacement fields and reduced in dimensionality (e.g., via principal component analysis) to provide a SSAM.

The SSAM may be useful in one or more of a variety of applications such as to capture or characterize variability in shape and material properties within a population, to generate synthetic virtual patients (i.e., virtual objects/body parts) having shapes and material properties within ranges of a training population, such as for computational modelling and simulation (CM&S), and/or to predict missing information from partial data sets.

Technical advantages of the present disclosure include, but are not limited to, relatively fast, efficient, and robust model training. Technical advantages further include improved performance and stability of a deformable registration process by computing displacement fields based on signed distance maps rather than mask volumes.

An image-based approach, as disclosed herein may be useful to generate new backgrounds and masks allowing for further image-bases processing and/or robust image-based volumetric meshing.

Displacement fields generated as disclosed herein may be re-used, such as for mapping of measurements (e.g., points and/or distances) between a reference mask and training masks and/or between the reference mask and virtual object/samples generated from the SSAM.

Where background intensity values are used in the deformable registration process, the deformable registration process may produce more accurate mappings between a reference mask and training masks, relative to a mesh-based technique that uses approximate methods to establish correspondence for non-boundary points.

FIG. 1 is a block diagram of a statistical shape and appearance model (SSAM) generator 100 that generates a SSAM 146 based on training data extracted from images of objects, according to an embodiment. The objects may include, without limitation, anatomical objects (e.g., bone and/or tissue). The images may include medical images such as, without limitation, computed tomography (CT) scans, micro CT scans, and/or magnetic resonance imaging (MRI) scans. The images may be obtained from a population of patients. The images may be referred to as training images, and the objects may be referred to as training objects.

In the example of FIG. 1, the training data includes training masks 102, training backgrounds 104, and a reference mask 108. Training masks 102 represent external surfaces or geometric shapes of the training objects. Training backgrounds 104 represent intensity information of the images (e.g., greyscale volumetric image data). Training masks 102 and training backgrounds 104 may be obtained/retrieved from a training population dataset 101. Reference mask 108 may be selected from training masks 102 or may be derived from training masks 102 (e.g., as a mean of training masks 102).

In the example of FIG. 1, SSAM generator 100 includes circuitry that performs various functions disclosed herein. The circuitry may be combined or distributed in one or more of a variety of combinations, without deviating from the scope of the present disclosure. Alternatively, or additionally, SSAM generator 100 may include a processor and memory configured with instructions/code to perform one or more of the functions disclosed herein.

Figure 2:
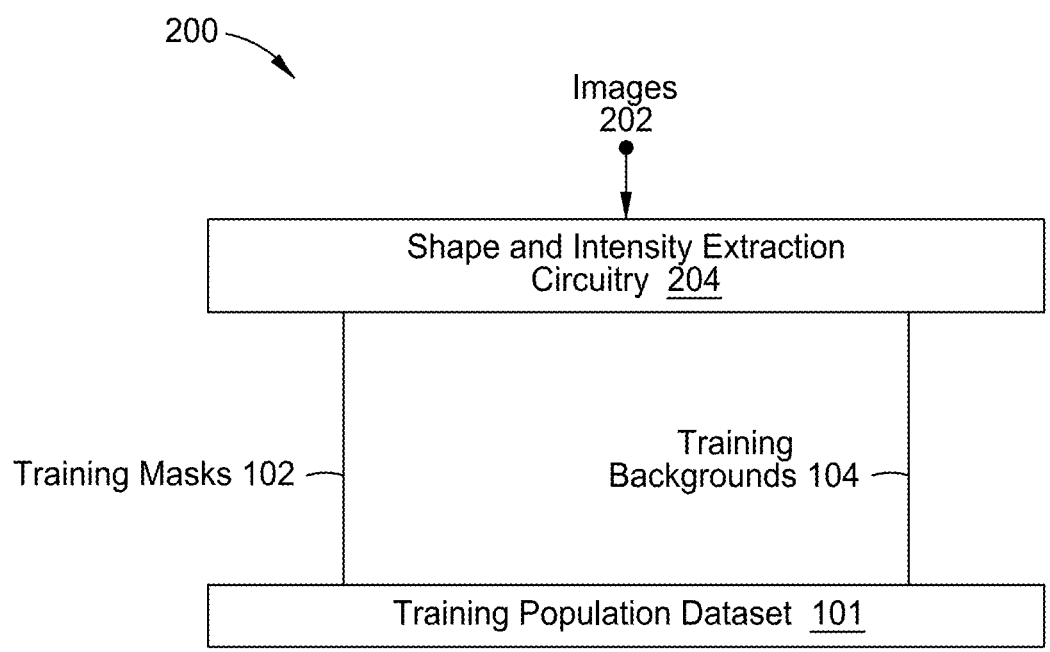
FIG. 2 is a block diagram of an image processing system that extracts training masks and training backgrounds from images, according to an embodiment.

FIG. 2 is a block diagram of an image processing system 200 that extracts training masks 102 and training backgrounds 104 from images 202, according to an embodiment. Images 202 may include 3-dimensional images constructed from multiple 2-dimensional images obtained from, for example, CT and/or MRI scans. In the example of FIG. 2, image processing system 200 includes shape and intensity extraction circuitry 204. Alternatively, or additionally, image processing system 200 may include a processor and memory configured with instructions/code to extract training masks 102 and training backgrounds 104.

Shape and intensity extraction circuitry 204 may partition an image 202 into segments (e.g., sets of pixels) based on variations amongst neighboring pixels of the image (e.g., based on an edge detection method). Shape and intensity extraction circuitry 204 may assign labels to the pixels based on the segments to which the pixels belong (i.e., pixels of a segment share the same label).

Shape and intensity extraction circuitry 204 may generate a training mask 102 to include a set of points distributed across a surface of one or more segments of an image 202. The points may be extracted from volume data, such as with a marching cubes method. Coordinates for the points may be combined as a vector that describes the shape. The points may be referred to as landmarks. Landmarks may not necessarily correspond to salient features (i.e., landmarks do not necessarily represent anatomically significant features of an object). Training masks 102 may further include connectivity information between the points, which may be useful to reconstruct the surface and calculate normal vectors. A point set with connectivity information may be referred to as a mesh. The term landmarks may be associated with or used interchangeably with point distribution models (PDMs). Segmentation and intensity extraction circuitry 204 are not, however, limited to the foregoing example segmentation techniques. Other examples include, without limitation, medial models, Fourier surfaces, and spherical harmonics (SPHARMs).

Shape and intensity extraction circuitry 204 may generate training backgrounds 104 based on intensity data of images 202. Training backgrounds 104 may include volumetric meshes that include points within an object for describing internal structures. Coordinates of the points may be collected into a vector that describes a volumetric shape. Where images 202 include images of bones, intensity data may represent bone density, which may be expressed, without limitation, in terms of Hounsfield units, bone mass density (BMD), or bone volume over total volume (BV/TV).

Figure 3:
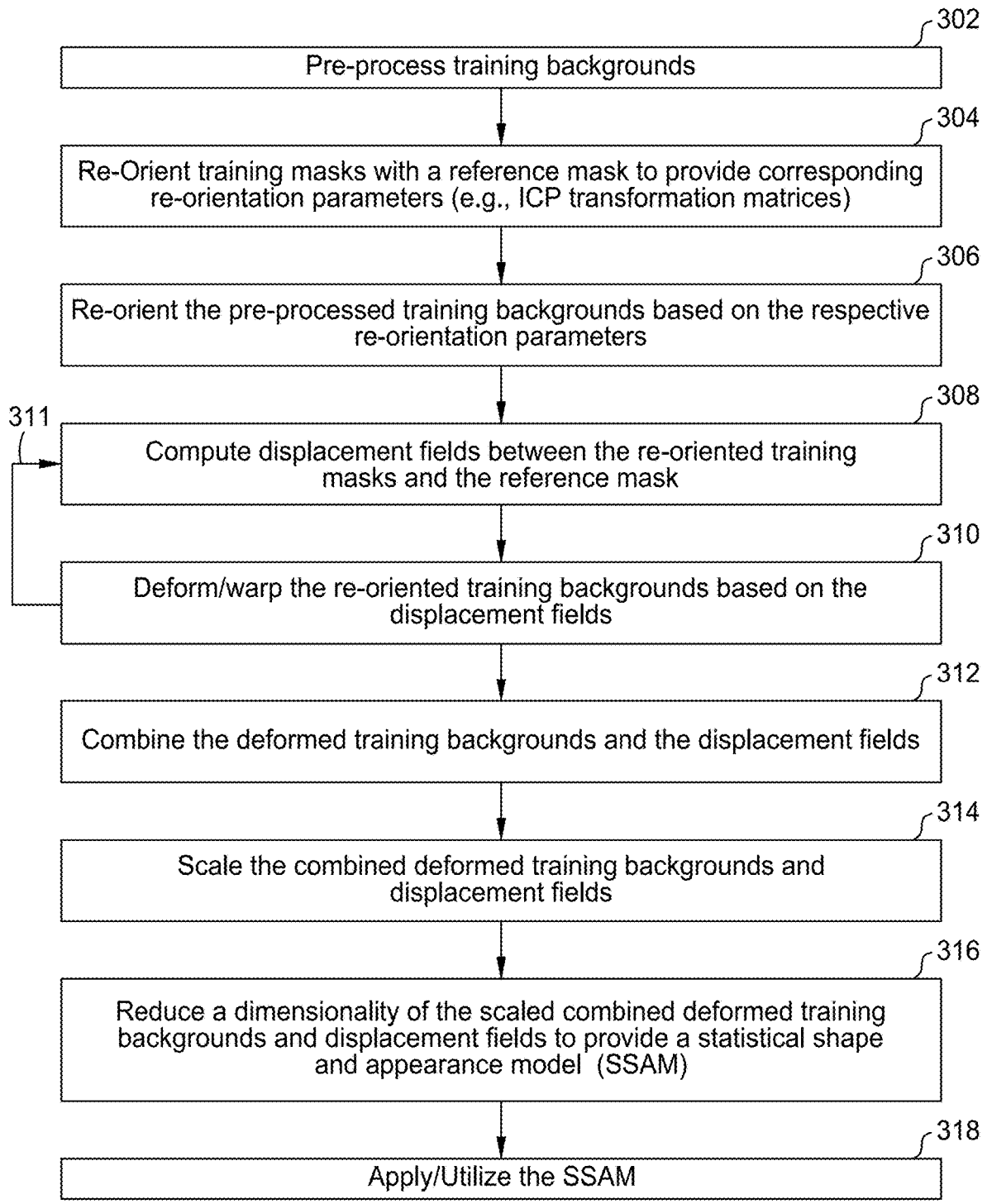
FIG. 3 is a flowchart of a method of generating a statistical shape and appearance model based on training masks and training backgrounds, according to an embodiment.

FIG. 3 is a flowchart of a method 300 of generating a SSAM based on training masks and training backgrounds, according to an embodiment. Due to the volume of data contained within training masks and training backgrounds, method 300 cannot practically be performed in a human mind. Rather, method 300 is performed by a machine (e.g., circuitry and/or a suitably programmed processor and memory). Method 300 is described below with reference to SSAM generator 100. Method 300 is not, however, limited to the example of SSAM generator 100.

At 302, pre-processing circuitry 114 pre-processes training backgrounds 104 to provide pre-processed training backgrounds 136. Pre-processing circuitry 114 may filter training backgrounds 104 (e.g., de-noising and/or clamping intensity values between a defined minimum bound and a maximum bound) and/or normalize training backgrounds 104 (e.g., normalize intensity values with a defined factor). Pre-processing circuitry 114 may be useful to ensure that training backgrounds 104 are compatible with one another and/or are compatible with other aspects of SSAM generator 100.

In order to generate SSAM 146, orientations and dimensions of training masks 102 and training backgrounds 104 should correspond to one another, such that any sample (e.g., a pixel or voxel) of any of training masks 102 or training backgrounds 104 represents the same relative position in other training masks 102 or training backgrounds 104. Such correspondence may be achieved by registering training masks 102 and training backgrounds 104 with reference mask 108. Registration is described below with reference to 304 through 310 of FIG. 3, and with reference to re-orientation circuitry 109 and deformable mask registration circuitry 111 in FIG. 1.

At 304, mask re-orientation circuitry 110 aligns or re-orients training masks 102 based on reference mask 108 to provide re-oriented training masks 130 and corresponding re-orientation parameters 132. Mask re-orientation circuitry 110 may translate, rotate, and/or re-size training mask 102 until the respective training masks 102 align with reference mask 108 (e.g., within a threshold(s)). The re-orienting may be referred to as rigid registration. Mask re-orientation circuitry 110 may be useful to reduce or remove differences in positions/orientations of training masks 102 and reference mask 108, which may be useful to avoid interpreting such differences as actual geometric variations amongst training masks 102.

Mask re-orientation circuitry 110 may perform an iterative closest point (ICP) method, and may output re-orientation parameters 132 to include ICP transformation matrices for respective training masks 102. The ICP method minimizes differences between two clouds of points by maintaining points of one cloud (i.e., reference mask 108) fixed, while transforming points of the other cloud (i.e., training masks 102) to best match reference mask 108. The re-orientation (i.e., translation, rotation, and/or re-sizing) is iteratively estimated in order to minimize an error metric (e.g., a sum of squared differences between the coordinates of the respective points). Mask re-orientation circuitry 110 may convert training masks 102 and reference mask 108 to triangulated meshes, which may provide relatively fast and accurate results from the ICP algorithm. Alternatively, or additionally, mask re-orientation circuitry 110 may utilize scaling and/or a modified ICP algorithm.

At 306, background re-orientation circuitry 116 re-orients (e.g., translates, rotates, and/or re-sizes) pre-processed training backgrounds 136 based on re-orientation parameters 132 (e.g., ICP transformation matrices) to provide re-oriented training backgrounds 138.

At 308, deformable mask registration circuitry 112 computes geometric differences/variations (e.g., biologically-induced variations) in shape between reference mask 108 and re-oriented training masks 130 as displacement fields 134. Displacement fields 134 represent backward transforms that map from reference mask 108 to respective re-oriented training masks 130. Deformable mask registration circuitry 112 may perform localized scaling of re-oriented training masks 130.

In an embodiment, deformable mask registration circuitry 112 computes signed distance maps of re-oriented training masks 130, and determines displacement fields 134 based on the signed distance maps (i.e., as approximations having pixel accuracy to Euclidean distances). Computing displacement fields 134 based on signed distance maps rather than mask volumes may improve performance and stability of the deformable mask registration process.

Deformable mask registration circuitry 112 may represent a displacement field 134 as an image with vector type pixels of N dimensions, where N is a dimension of reference mask 108.

Deformable mask registration circuitry 112 may utilize a Diffeomorphic Demons deformable method that deformably registers re-oriented training masks 130 with reference mask 108 by computing displacement fields 134 that map re-oriented training masks 130 onto reference mask 108. Diffeomorphic Demons is a non-parametric diffeomorphic image registration method, which is essentially an extension of a Demons method. The Demons method registers two images by computing a deformation field that maps a moving image onto a fixed image. The Demons method treats non-parametric image registration as an optimization problem that seeks the displacement of each pixel in order to obtain a reasonable alignment of the fixed and moving images. Diffeomorphic Demons uses a speed vector field instead of a deformation field use in the conventional Demons' expression to obtain a non-parametric diffeomorphic image registration.

In mathematics, a diffeomorphism is an isomorphism of smooth manifolds (an isomorphism is a structure-preserving mapping between two structures of the same type that can be reversed by an inverse mapping). A diffeomorphism is an invertible function that maps one differentiable manifold to another such that both the function and its inverse are differentiable. A diffeomorphic mapping system is a system designed to map, manipulate, and transfer information which is stored in multiple types of spatially distributed medical imagery.

Alternatively, or additionally, deformable mask registration circuitry 112 may utilize a free form deformation (FFD) method. The FFD method is widely used in image registration, and is often implemented using B-splines, in which the displacement of a point is represented as a linear combination of the displacements of a corresponding control point. Using a smooth B-spline basis, the transformations are implicitly regularized to ensure they are continuous and smooth. FFD registration uses a regular grid and is thus particularly suitable for intensity-based registration where a regular grid is easily defined.

At 310, deformable background registration circuitry 118 deforms/warps re-oriented training backgrounds 138 based on displacement fields 134 computed at 308 to provide deformed training backgrounds 140. Deformable background registration circuitry 118 essentially deforms re-oriented training backgrounds 138 to match the shape of reference mask 108.

In an embodiment, SSAM generator 100 deformably registers re-oriented training masks 130 and re-oriented training backgrounds 138 iteratively, as illustrated at 311. For example, in FIG. 1, deformable registration circuitry 111 may deformably register signed distance maps of re-oriented training masks 130 to provide an initial set of displacement fields 134-1. Deformable background registration circuitry 118 may then generate an initial set of revised displacement fields 141-1 based on the initial set of displacement fields 134-1. Deformable mask registration circuitry 112 may then generate a revised set of displacement fields 134-2 based on the initial set of revised displacement fields 141-1. Deformable background registration circuitry 118 may then generate a revised set of displacement fields 141-2 based on the revised set of displacement fields 134-2. The iterative process may continue for a predetermined number of iterations (i.e., n times), and/or until a threshold measure of refinement is obtained. At the conclusion of the iterative process, deformable registration circuitry 111 outputs a final set of displacement fields 134 and a final set of deformed training backgrounds 140.

At 312, combining circuitry 120 combines (e.g., concatenate) deformed training backgrounds 140 and displacement fields 134. Combining circuitry 120 may combine deformed training backgrounds 140 and displacement fields 134 in a matrix.

At 314, scaling circuitry 122 scales an output 142 of combining circuitry 120. Where output 142 includes a matrix, scaling circuitry 122 may divide rows of the matrix by the means or standard deviations of the respective rows. An output 144 of scaling circuitry 122 may include a scaled matrix of deformed training backgrounds 140 and displacement fields 134. Scaling may be useful for principal component analysis (PCA), such as described below with reference to 316.

At 316, dimensionality reduction circuitry 124 reduces a dimensionality of output 144 of scaling circuitry 122 to provide SSAM 146. Dimensionality reduction circuitry 124 may perform a principal component analysis (PCA) that provides SSAM 146 with a mean dataset, modes of variation (e.g., Eigen vectors), and weighting (e.g., Eigen values), where the modes of variation and the weighting reflect variations in the training objects relative to a mean of training population dataset 101.

Dimensionality reduction circuitry 124 may also perform PCA separately for deformed training backgrounds 140 and displacement fields 134 (i.e., bypassing combining circuitry 120, and scaling deformed training backgrounds 140 and displacement fields 134 separately), to generate separate shape and appearance models, which may be used or compared separately. Alternatively, method 300 may generate separate shape and appearance models in place of a SSAM. In this embodiment, method 300 may omit the combining at 312 (and SSAM generator 100 may omit combining circuitry 120), perform the scaling at 134 separately for deformed training backgrounds 140 and displacement fields 134 with respective scaling circuitry, and perform PCM separately for the scaled deformed training backgrounds and displacement fields.

At 318, SSAM application circuitry 126 applies or uses SSAM 146 in one or more applications. For example, and without limitation, SSAM application circuitry 126 may use SSAM 146 to generate virtual objects (i.e., masks and backgrounds), analyze variability in shape and material properties of the population of objects represented within training population dataset 101, and/or predict missing information from a partial dataset of masks and backgrounds extracted from images of other objects. For example, wherein SSAM 146 includes a mean dataset, modes of variation, and weighting, SSAM application circuitry 126 may generate virtual objects for which shapes and intensities are based on the mean dataset, with variations based on the modes of variation and the weighting. In an embodiment, SSAM application circuitry 126 generates virtual objects by inverting displacement fields of SSAM 146. For example, PCA circuitry (e.g., within dimensionality reduction circuitry 124), may generate a covariance matrix that includes eigenvectors and eigenvalues, and SSAM application circuitry 126 may generates a virtual object by combining the eigenvectors and eigenvalues, an example of which is provided below.

Given a set of data points X, the PCA circuitry may compute a covariance matrix C as:

$$C = 1/(N-1) * X^\wedge T * X,$$

where N is the number of data points and X^T is the transpose of X. The PCA circuitry may then compute eigenvectors and eigenvalues of C using an eigen decomposition:

$$C^{**}V = \Lambda * V,$$

where V is a matrix whose columns are the eigenvectors of C, and Λ is a diagonal matrix whose entries are the eigenvalues.

To generate a new sample, SSAM application circuitry 126 uses the eigenvectors and eigenvalues to compute a linear combination of the original data points. Given a set of weights w, the new sample may be computed as:

$$\text{new sample} = \text{mean} * w$$

SSAM application circuitry 126 may sort the eigenvectors and eigenvalues in decreasing order of importance to obtain the most significant modes of variability in the data. In practice, only the top K eigenvectors and eigenvalues may be used to generate new samples, where K is a user-specified parameter.

SSAM application circuitry 126 then extracts a displacement field and corresponding background from the covariance matrix C, inverts the displacement field that transforms the sample to its original image space, and uses the inverted displacement field to deform the reference mask and the extracted background to provide the virtual object.

Figure 4:
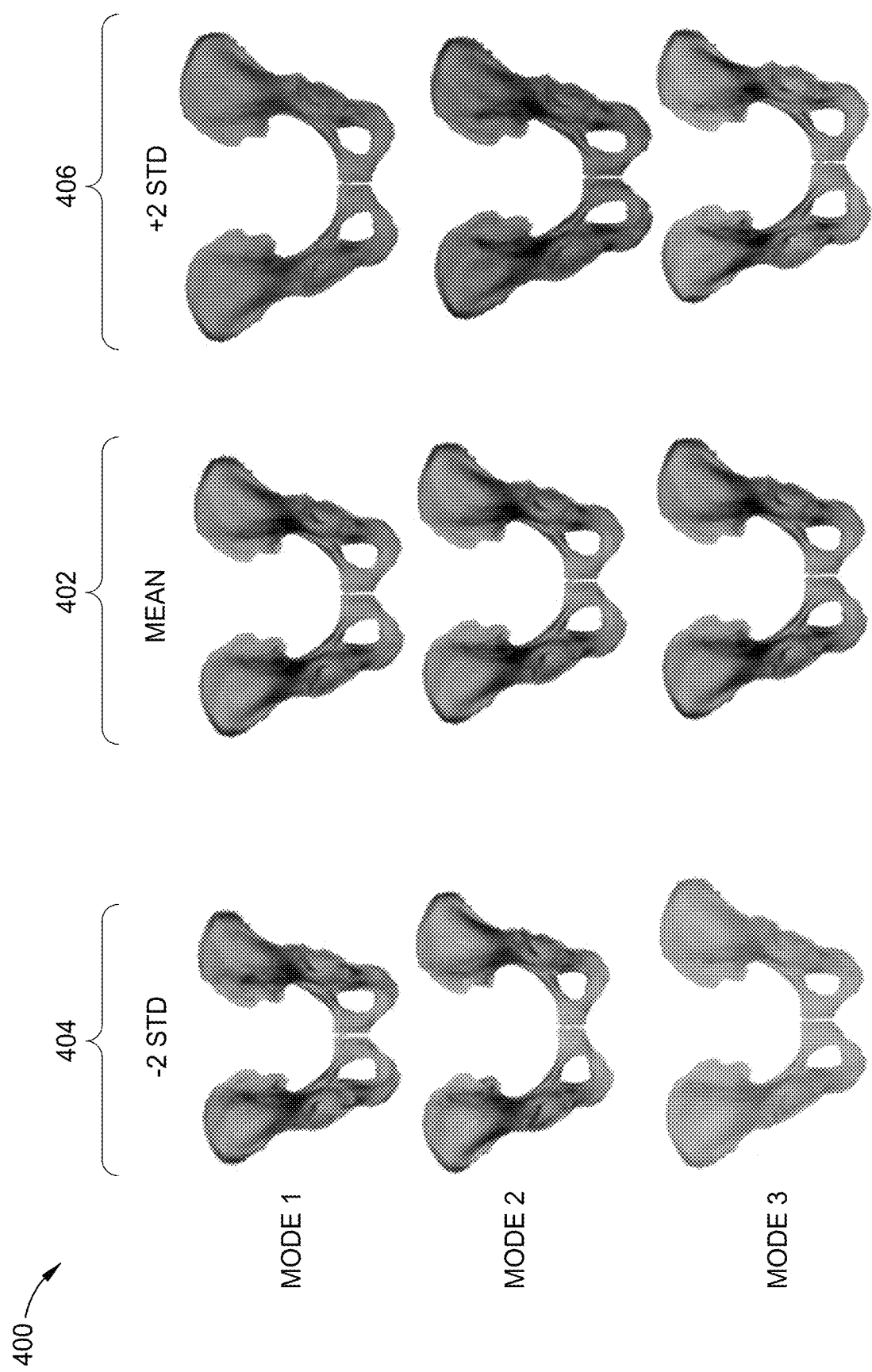
FIG. 4 is an image of synthetic or virtual samples generated from an experimental SSAM, according to an embodiment.

An experimental SSAM was generated from a training set of CT scans of 15 pelvises. Experimental results are provided below with reference to FIGS. 5, 6A, and 6B. The experimental results are provided for illustrative purposes. Methods and systems disclosed herein are not limited to the experimental results. After building the experimental SSAM, synthetic (i.e., virtual) samples were generated using PCA. FIG. 4 is an image 400 of the synthetic samples. FIG. 4 shows shape geometries (i.e., masks) and corresponding background intensity distributions. FIG. 4 includes a mean model 402, shapes 404 generated using −2 standard deviation, and shapes 406 generated using +2 standard deviation.

For these experimental results, the first eight principal modes, accounting for 95% of the total shape variation in which 48% variability was recorded by principal mode 1, 14.2% by mode 2, and 14% by mode 3, were found to represent variations in the shape morphology. These figures are provided for illustrative purposes. The generalization error is calculated with leave-one-out to measure how accurately the experimental SSAM can generate synthetic samples. The reconstruction error of the generated shape geometries was evaluated in term of point-to-surface method. The root mean square (RMS) is used to represent the reconstruction error.

A comparison of measured distances between three points of each of the synthetic samples and the training set of CT scans of the 15 pelvises was completed to indicate geometrical differences between the synthetic samples generated using the experimental SSAM and the training set. The distances may be measured between selected anatomical landmarks of a pelvis (e.g., key points used to characterize a Pelvis). The comparison of the measured distances illustrates similarities between the training set and the synthetic samples. Having a good agreement between the training set and synthetic samples is an indicator of the quality of experimental SSAM.

Figure 5A:
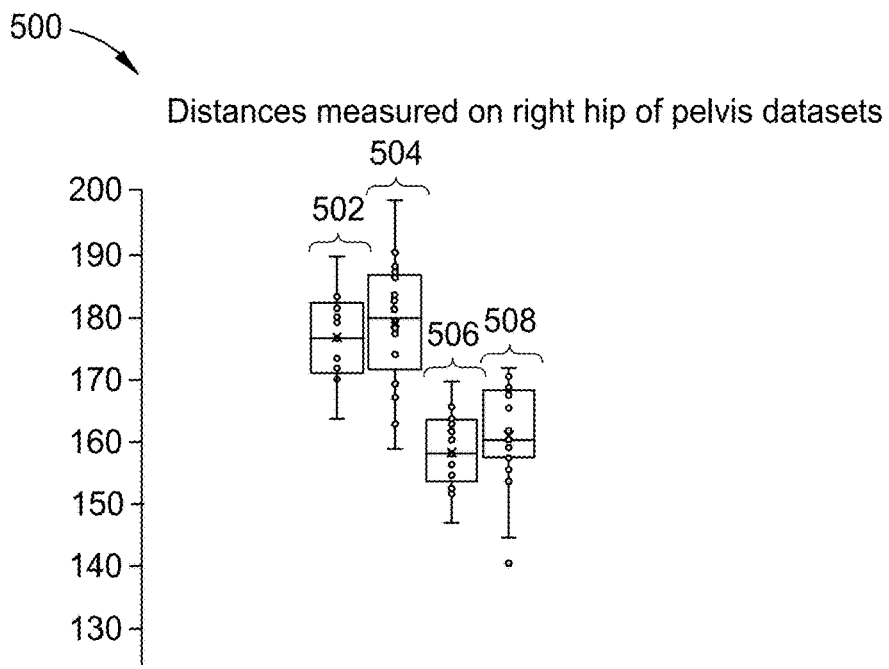
FIG. 5A illustrates box plot distributions for the experimental SSAM (i.e., distances between posterior superior iliac spine and pubic tubercle, and distances between posterior superior iliac spine and anterior superior iliac spine), according to an embodiment.

FIG. 5A illustrates box plot distributions 500 for the experimental SSAM, according to an embodiment. Box plot distributions 500 are for distances between the posterior superior iliac spine and the pubic tubercle, and distances between the posterior superior iliac spine and the anterior superior iliac spine. Box plot distributions 500 include:
- distributions 502, synthetic samples, posterior superior iliac spine—public tubercle;
- distributions 504, training set, posterior superior iliac spine—public tubercle;
- distributions 506, synthetic samples, posterior superior iliac spine—anterior superior iliac spine; and
- distributions 508, training set, posterior superior iliac spine—anterior superior iliac spine.

Figure 5B:
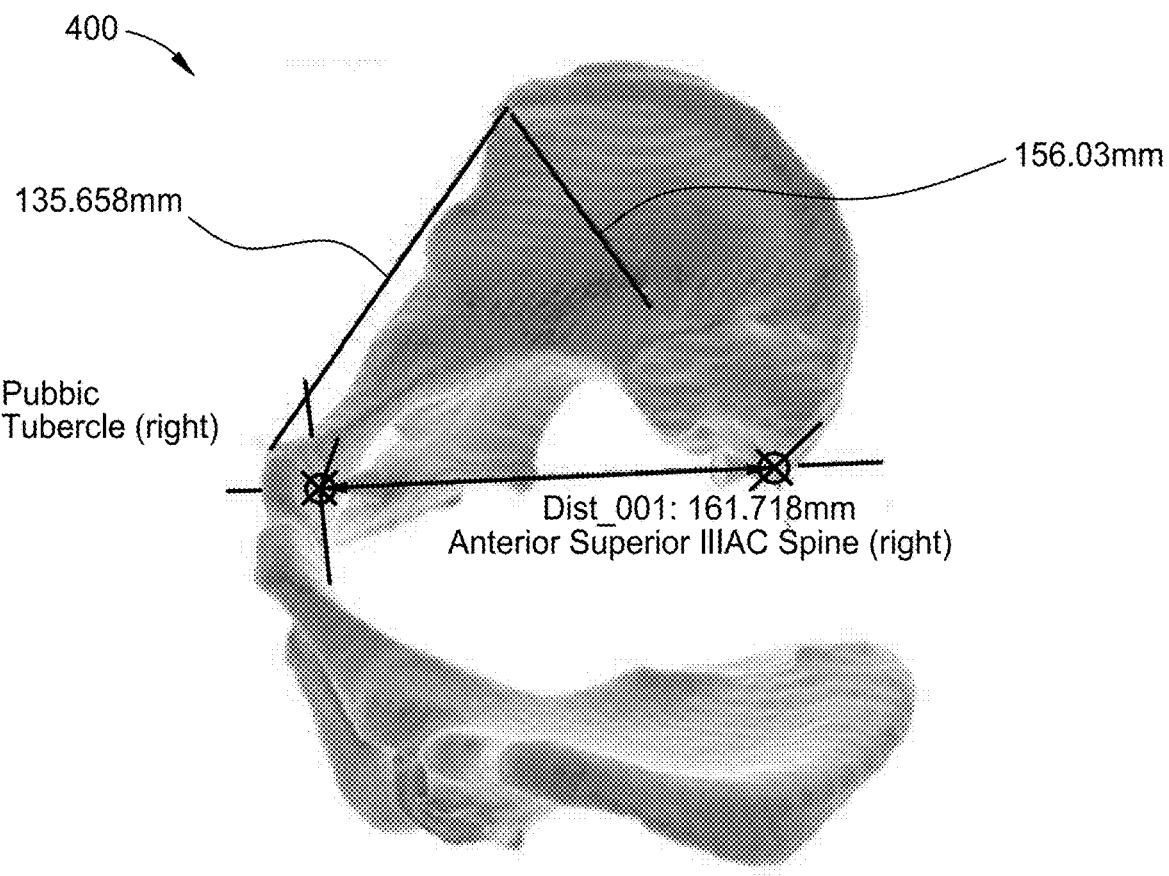
FIG. 5B is an image of a representative virtual pelvis generated by the experimental SSAM.

FIG. 5B is an image of a representative synthetic pelvis 550 generated by the experimental SSAM (i.e., generated at 318 in FIG. 3).

Figure 6:
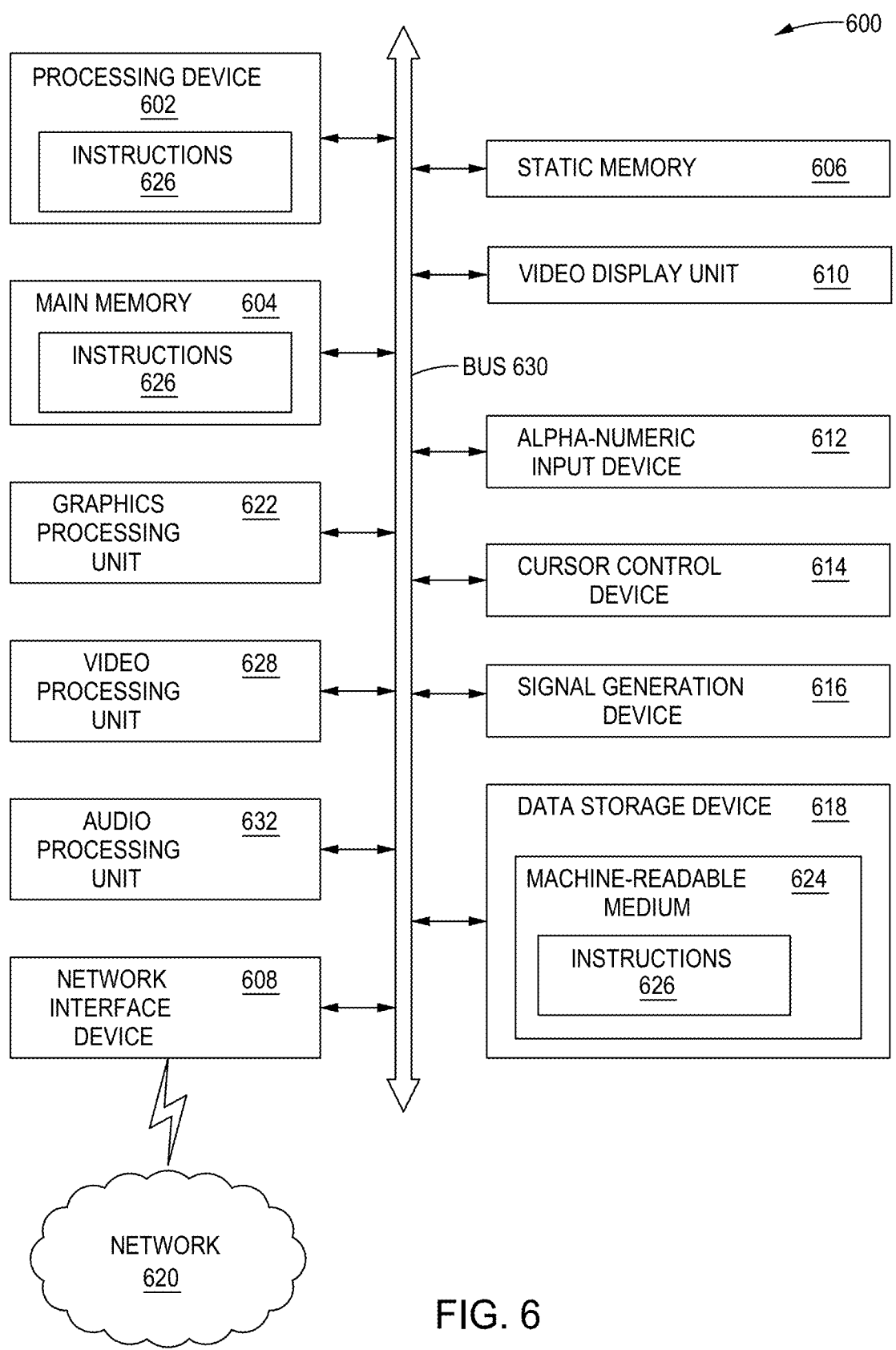
FIG. 6 depicts a diagram of an example computer system in which embodiments of the present disclosure may operate, according to an embodiment.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A machine-implemented method, comprising:
   receiving a reference mask, training masks, and training backgrounds, wherein the reference mask represents a 3-dimensional shape of a reference object, wherein the training masks represent external surfaces of training objects, wherein the training backgrounds comprise intensity data of the training objects, and wherein the intensity data represents one or more of color and texture;
   re-orienting the training masks to align the training masks with the reference mask to provide re-orientation parameters for the training masks;
   deforming the re-oriented training masks based on the reference mask to provide displacement fields indicative of differences between a 3-dimensional shape of the reference mask and 3-dimensional shapes of the re-oriented training masks;
   re-orienting the training backgrounds based on the re-orientation parameters determined for the training masks to provide re-oriented training backgrounds;
   deforming the re-oriented training backgrounds based on the displacement fields of the respective training masks to provide deformed training backgrounds;
   combining the deformed training backgrounds and the displacement fields; and
   reducing a dimensionality of the combined deformed training backgrounds and displacement fields to provide a statistical shape and appearance model (SSAM).

2. The method of claim 1, wherein the re-orienting training masks comprises:
   converting the training masks and the reference mask to triangulated meshes; and
   re-orienting the triangulated meshes of the training masks to the triangulated meshes of the reference mask based on an iterative closest point method to provide the re-orientation parameters to include iterative closest point transformation matrices.

3. The method of claim 1, wherein the deforming the re-oriented training masks comprises:
   computing signed distance maps of the re-oriented training masks and the reference mask; and
   computing the displacement fields based on the signed distance maps.

4. The method of claim 3, wherein the computing the displacement fields comprises computing the displacement fields with a diffeomorphic demons deformable method.

5. The method of claim 3, wherein the deforming the re-oriented training masks further comprises representing the displacement fields as images having vector-type pixels with N elements, where N is a dimensionality of the reference mask.

6. The method of claim 3, wherein:
   the combining comprises combining the deformed training backgrounds and the displacement fields in a matrix; and
   the method further comprises scaling the matrix, wherein the scaling comprises computing means of rows of the matrix and dividing the rows of the matrix by the means of the respective rows.

7. The method of claim 6, wherein the reducing the dimensionality comprises:
   reducing a dimensionality of the matrix based on principal component analysis to provide the statistical shape and appearance model to include a mean dataset, modes of variation, and weighting, wherein the modes of variation and the weighting reflect variations in the objects relative to a mean of the objects.

8. The method of claim 3, further comprising:
   iteratively refining the displacement fields and the deformed training backgrounds based on one another to provide a refined set of deformed training backgrounds and a refined set of displacement fields;
   wherein the combining comprises combining the refined set of deformed training backgrounds and the refined set of displacement fields.

9. The method of claim 1, further comprising using the statistical shape and appearance model to perform one or more of:
   generate virtual objects based on variations amongst the training masks and the training backgrounds;
   analyze variability in shape and material properties of the training objects based on variations amongst the training masks and the training backgrounds; and predict missing information from a partial dataset of masks and backgrounds extracted from 3-dimensional images of other objects.

10. A non-transitory computer readable medium encoded with a computer program that comprises instructions to cause a processor to:
compute signed distance maps based on training masks and of a reference mask, wherein the training masks represent 3-dimensional shapes of a population of objects extracted from 3-dimensional images of the objects, and wherein the reference mask represents a 3-dimensional shape of a reference object;
compute displacement fields for the training masks based on the respective signed distance maps, wherein the displacement fields represent geometric differences between the reference mask and the training masks;
deform training backgrounds based on the displacement fields computed for the training masks to provide deformed training backgrounds, wherein the training backgrounds comprise volumetric intensity data extracted from the 3-dimensional images of the objects, and wherein the intensity data represents one or more of color and texture;
combine the deformed training backgrounds and the displacement fields; and
reduce a dimensionality of the combined deformed training backgrounds and displacement fields to provide a statistical shape and appearance model (SSAM).

11. The non-transitory computer readable medium of claim 10, further comprising instructions to cause the processor to:
compute the displacement fields with a diffeomorphic demons deformable method.

12. The non-transitory computer readable medium of claim 10, further comprising instructions to cause the processor to:
represent the displacement fields as images having vector-type pixels with N elements, where N is a dimensionality of the reference mask.

13. The non-transitory computer readable medium of claim 10, further comprising instructions to cause the processor to:
combine the deformed training backgrounds and the displacement fields in a matrix.

14. The non-transitory computer readable medium of claim 13, further comprising instructions to cause the processor to scale the matrix, including to:
compute means of rows of the matrix; and
divide the rows of the matrix by the means of the respective rows.

15. The non-transitory computer readable medium of claim 13, further comprising instructions to cause the processor to:
reduce a dimensionality of the matrix based on principal component analysis to provide the statistical shape and appearance model to include a mean dataset, modes of variation, and weighting, wherein the modes of variation and the weighting reflect variations in the objects relative to a mean of the objects.

16. The non-transitory computer readable medium of claim 10, further comprising instructions to cause the processor to use the statistical shape and appearance model to perform one or more of:

generate virtual objects based on variations amongst the training masks and the training backgrounds;
analyze variability in shape and material properties of the population of objects based on variations amongst the training masks and the training backgrounds; and
predict missing information from a partial dataset of masks and backgrounds extracted from 3-dimensional images of other objects.

17. An integrated circuit (IC) device, comprising:
re-orientation circuitry to align training masks with a reference mask to provide re-orientation parameters for the training masks, and to re-orient training backgrounds based on the re-orientation parameters determined for the training masks to provide re-oriented training backgrounds, wherein the training masks represent external surfaces of training objects, wherein the training backgrounds comprise intensity data of the training objects, and wherein the intensity data represents one or more of color and texture;
deformable registration circuitry to deform the re-oriented training masks based on the reference mask to provide displacement fields indicative of differences between a 3-dimensional shape of the reference mask and 3-dimensional shapes of the re-oriented training masks, and to deform the re-oriented training backgrounds based on the displacement fields of the respective training masks to provide deformed training backgrounds;
combining circuitry to combine the deformed training backgrounds and the displacement fields; and
dimensionality reduction circuitry configured to reduce a dimensionality of the combined deformed training backgrounds and displacement fields to provide a statistical shape and appearance model (SSAM).

18. The IC device of claim 17, wherein the deformable registration circuitry is further configured to deform the re-oriented training masks and the re-oriented training backgrounds by:
deformably registering signed distance maps of the re-oriented training masks to provide an initial set of displacement fields;
deformably registering background intensity values of the re-oriented training backgrounds based on the initial set of displacement fields to provide an initial set of deformed training backgrounds and a refined set of displacement fields;
generating a revised set of displacement fields based on the revised set of displacement fields; and
generating a revised set of deformed training backgrounds based on the revised set of displacement fields,
deform the set of re-oriented training backgrounds based on the refined set of displacement fields to provide a final set of deformed training backgrounds.

19. The IC device of claim 17, further comprising SSAM application circuitry configured to perform one or more of:
generate virtual objects based on variations amongst the training masks and the training backgrounds;
analyze variability in shape and material properties of the training objects based on variations amongst the training masks and the training backgrounds; and
predict missing information from a partial dataset of masks and backgrounds extracted from 3-dimensional images of other objects.

* * * * *